US012744821B2

(12) United States Patent
Pitts et al.

(10) Patent No.: US 12,744,821 B2
(45) Date of Patent: Sep. 22, 2026

(54) SYSTEMS, METHODS, AND DEVICES FOR ENVIRONMENT AND NETWORK CONTROL

(71) Applicant: Next Step Group, Inc., Clinton, MS (US)

(72) Inventors: Timothy Pitts, Clinton, MS (US); Gary Mccrorey, Clinton, MS (US)

(73) Assignee: Next Step Group, Inc., Clinton, MS (US)

( * ) Notice: Subject to any disclaimer, the term of this patent is extended or adjusted under 35 U.S.C. 154(b) by 126 days.

(21) Appl. No.: 18/890,559

(22) Filed: Sep. 19, 2024

(65) Prior Publication Data

US 2025/0097270 A1 Mar. 20, 2025

Related U.S. Application Data

(60) Provisional application No. 63/583,683, filed on Sep. 19, 2023.

(51) Int. Cl.
*H04L 9/40* (2022.01)
*H04L 41/085* (2022.01)
*H04L 41/0866* (2022.01)

(52) U.S. Cl.
CPC ............ *H04L 63/20* (2013.01); *H04L 41/085* (2013.01); *H04L 41/0866* (2013.01)

(58) Field of Classification Search
CPC ... G06F 21/577; H04L 63/1433; H04L 63/20; H04L 41/085; H04L 41/0866
See application file for complete search history.

(56) References Cited

U.S. PATENT DOCUMENTS

| | | | | |
|---|---|---|---|---|
| 12,206,700 | B1 * | 1/2025 | Miseiko | H04L 63/12 |
| 2004/0204949 | A1 * | 10/2004 | Shaji | G06F 11/1415 714/E11.122 |
| 2018/0091558 | A1 * | 3/2018 | Daugherty | G06F 21/577 |
| 2020/0220902 | A1 * | 7/2020 | Schlotman, Jr. | H04L 41/0266 |
| 2021/0141648 | A1 * | 5/2021 | Halim | G06F 9/4416 |
| 2021/0194929 | A1 * | 6/2021 | Garrett | G06F 21/577 |
| 2025/0097270 | A1 * | 3/2025 | Pitts | H04L 63/20 |

OTHER PUBLICATIONS

Souppaya et al. NIST Special Publication 800-68 (Year: 2005).*

* cited by examiner

*Primary Examiner* — David R Lazaro
(74) *Attorney, Agent, or Firm* — GREENBERG TRAURIG LLP; Richard Mauldin

(57) ABSTRACT

Embodiments of the presently disclosed subject matter relate to systems, methods, and devices for asset control and management systems. According to some embodiments, an asset control and management system can comprise a network comprising a network memory; and a host computer connected to the network, the host computer comprising a non-transitory computer-readable medium comprising instructions executable by a processor to: operate a management program configured to access a checklist; determine a difference between an asset status and the checklist; receive from a network database associated with the network memory an executable program associated with a response; and implement the response to change the asset to match the checklist.

20 Claims, 12 Drawing Sheets

335

SYSTEMS, METHODS, AND DEVICES FOR ENVIRONMENT AND NETWORK CONTROL

RELATED APPLICATIONS

This application claims the benefit of U.S. Provisional Patent Application Ser. No. 63/583,683, filed Sep. 19, 2023. The disclosure of which is hereby incorporated, by reference, in its entirety.

BACKGROUND OF THE INVENTION

Field of the Invention

The presently disclosed subject matter generally relates to systems, methods, and devices for the management of security and operational parameters in computer systems.

Background

Current virtual systems, in isolation or replicated or connected over a network, contain certain systems so a user can review the protocols of those virtual systems. Current protocol review systems include review through operating system reports or bios screens. These review systems are cumbersome and slow because they require individual user review of each protocol that must be found through specific menus or submenus or by running different searches or executable files. There is a thus a need for an environment that can provide improved protocol review and modification capabilities.

Over a network, with multiple client users using different virtual systems with different hardware, current systems require tedious review of each virtual system/hardware combination. Each virtual system/hardware combination must be reviewed or adjusted to ensure the different local systems are compatible and compliant with protocols, settings, and configurations common across the network. Because of the extent of the task of reviewing and changing each virtual system/hardware combination, teams of engineers are required, and those teams also need to correspond with each other regarding how to consistently implement changes. Current systems are inadequate at efficiently performing these reviews and changes and require many work hours. Further, current systems do not allow for collaboration or for consistent implementation across those teams. Thus, there is a need for improved protocol review systems that can be configured to provide centralized control without the need for individual system/hardware combination control.

In some cases, Security Technical Implementation Guides (STIGs) are published that inform a user's methodology for standardized secure installation of operating systems, software, and hardware as part of a computer system. In current systems, checklists of STIGs are used by an engineer to check each aspect of a computer system to ensure it is compliant, but the STIGs must be painstakingly reviewed for each individual system, which may lead to inconsistent or incorrect application across different systems. There is a need for an improved system that incorporates STIG checklists into an accessible program across a network for each computer system in the network. Further, improved systems will help identify and mitigate potential security risks both generally and specific to certain software and hardware.

SUMMARY

Briefly described, embodiments of the presently disclosed subject matter relate to systems and methods for protocol control and management systems. According to some embodiments consistent with the present disclosure, an asset control and management system can comprise a network comprising a network memory; and a host computer connected to the network, the host computer comprising a non-transitory computer-readable medium comprising instructions executable by a processor to: operate a management program configured to access a database of asset settings, protocols, or configurations; determine a difference between an asset status and the database; receive from a network database associated with the network memory an executable program associated with a response; and implement the response within the asset by adjusting a setting associated with the difference.

In some embodiments, the executable program can be based on a combination of hardware and software. In some embodiments, the management program can send data to and receive data from a graphical user interface configured to display a result of a compliance event associated with an execution of the response. In some embodiments, the graphical user interface can be configured to report an update to the response associated with a compliance event. In some embodiments, the graphical user interface can be configured to display a determined status of each asset or system connected to the network. In some embodiments, the instructions may further comprise generating a proposed response including identifying a remedial executable program based on the status of the asset compared to the checklist, wherein a graphical user interface is configured to display the proposed response and a result of a compliance event associated with the executable program. In some embodiments, the executable program may be configured to change a number of protocols or settings associated with the assets connected to the network. In some embodiments, the operation of the management program may be responsive to an update to the checklist.

According to some embodiments consistent with the present disclosure, an asset control and management system can comprise a network server with access to a non-transitory computer-readable medium, the network server associated with a web-based application; and a host computer connected to the network server, the host computer comprising a non-transitory computer-readable medium comprising instructions executable by a processor to: operate the web-based application to access a protocol template, wherein the web-based application comprises instructions to: determine a difference between a host computer protocol and the protocol template; receive from a network database associated with the network memory a protocol change program; and implement the protocol change program to change the host computer protocol to the protocol template.

According to some embodiments consistent with the present disclosure, an asset control and management system comprising a network server with access to a non-transitory computer-readable medium, the network server associated with a web-based application, the non-transitory computer-readable medium comprising instructions executable by a processor to: send instructions to a host computer that are executable by a processor of the host computer, the instructions to: determine a difference between a host computer protocol of the host computer and a protocol template stored in a database associated with the network server; and execute a protocol change program to change the host computer protocol to the protocol template.

The foregoing summarizes only a few aspects of the presently disclosed subject matter and is not intended to reflect the full scope of the presently disclosed subject matter as claimed. Additional features and advantages of the presently disclosed subject matter are set forth in the following description, may be apparent from the description, or may be learned by practicing the presently disclosed subject matter. Moreover, both the foregoing summary and following detailed description are exemplary and explanatory and are intended to provide further explanation of the presently disclosed subject matter as claimed.

BRIEF DESCRIPTION OF THE DRAWINGS

The accompanying drawings, which are incorporated in and constitute a part of this specification, illustrate multiple embodiments of the presently disclosed subject matter and, together with the description, serve to explain the principles of the presently disclosed subject matter; and, furthermore, are not intended in any manner to limit the scope of the presently disclosed subject matter.

Figure 1:
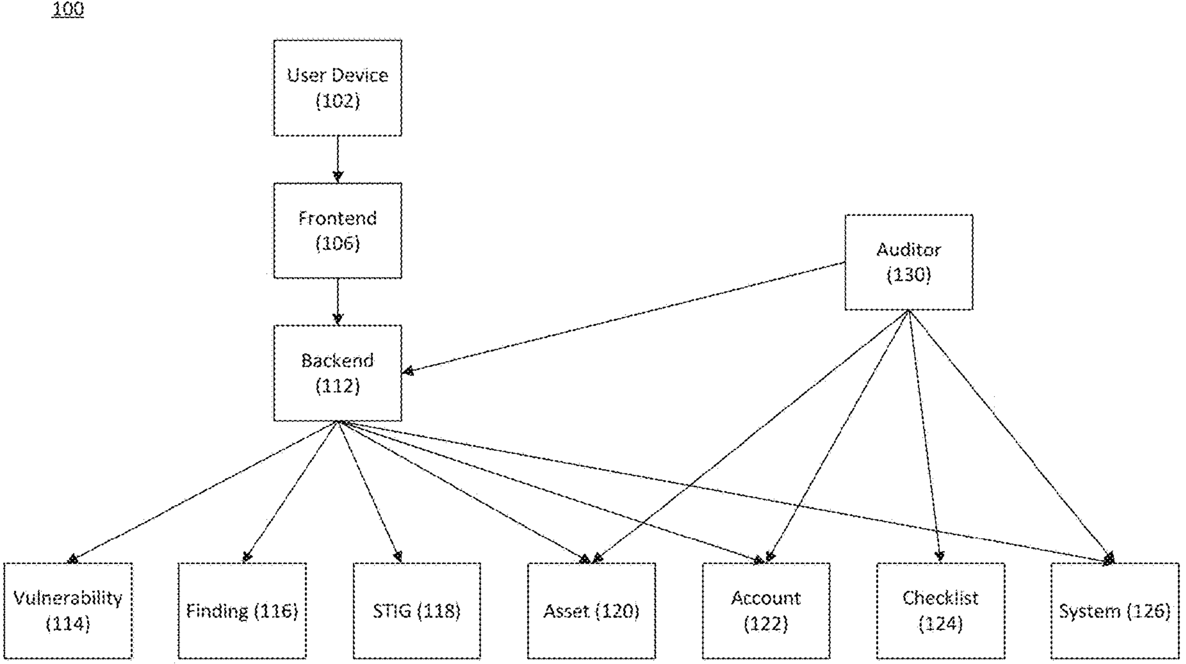
FIG. 1 illustrates an overview of an asset management and control system according to some embodiments of the present disclosure.

It is to be understood that both the foregoing general description and the following detailed description are exemplary and explanatory only and are not restrictive of the scope of the invention.

DETAILED DESCRIPTION

Disclosed embodiments relate to systems, methods, and devices for the management of security and operational parameters in computer systems. Disclosed embodiments may be installed by an organization on a local network or an on-premises network to efficiently determine and track compliance requirements for the organization's assets. The assets may be part of the local network or on-premises network. Disclosed embodiments may identify and implement remediation measures, for example, to modify configuration settings of assets. Remediation is extremely challenging because it requires significant time to ensure each system is modified correctly and then operates correctly thereafter. Further, performing changes on systems may lead to the creation of vulnerabilities rather than eliminating them.

Disclosed embodiments may allow for protocol review and modification capabilities by managing each of the organization's assets from a program configured to centrally track and control each asset and each asset's compliance requirements and record. Disclosed embodiments may ensure the different local systems are compatible and compliant with protocols, settings, and configurations common across the network. Disclosed embodiments may include a computer program that allows for collaboration or for consistent implementation across the organization's assets. Disclosed embodiments may incorporate checklists into an accessible program across the organization's network for each asset in the network. Disclosed embodiments may identify and mitigate potential security risks both generally and specific to certain software and hardware, individually or grouped into similar systems. Disclosed embodiments may allow continuous monitoring and/or responding to updates.

Disclosed embodiments may be computer program hosted on a cloud environment so as to be accessible from any connected user device. The cloud environment may also support multi-tenant support, real-time collaboration from systems outside of the organization's network as well as from inside the organization's network, and enhanced data analytics. The multi-tenant support may be accomplished by providing a computer program hosted as a single instance to multiple users, thus allowing each user to see changes by other tenants and allow real-time updates to any systems to be displayed to each tenant immediately.

Reference will now be made in detail to exemplary embodiments, some examples of which are shown in the accompanying drawings.

To facilitate an understanding of the principles and features of the invention, various illustrative embodiments are explained below. In particular, the presently disclosed subject matter is described in the context of systems, devices, and methods for the management of security and operational parameters in computer systems.

Exemplary disclosed embodiments include apparatuses, systems, and methods for an asset management and control system.

Referring now to the figures, wherein like reference numerals represent like parts throughout the views, the schematic will be described in detail.

FIG. 1 illustrates an overview of a protocol management and control system according to some embodiments of the present disclosure.

Specifically, FIG. 1 illustrates a schematic of web-application 100. Web-application 100 may operate on a network server. Web-application 100 may be accessible through a web browser. Web-application 100 may be associated with a graphical user interface to display, receive, or send data associated with use of web-application 100. Web-application 100 may be viewable on a monitor associated with a host computer or another computer connectable to the network server. A frontend 106 may be configured to operate the web-application 100. In some embodiments, the network server may be a virtual server. In some embodiments, the frontend may operate based on remotely executed software. In some embodiments, the frontend may operate through a local area network. In some embodiments, the frontend may operate on a single computer system. In some embodiments, frontend 106 can be run on a distributed computing systems or a single computing system.

The frontend 106 can comprise instructions stored on a non-transitory computer readable medium configured to be executed by a processor. The medium may be part of a host computer or another computer connectable or connected to the network server.

The graphical user interface can be configured to receive input from a user 1002 through an input device (e.g., a keyboard, a mouse, a touchscreen, voice commands, etc.) associated with the frontend 106. In some embodiments, frontend 106 may be operable after a user 1002 authenticates or interacts with the frontend 106. If authentication fails, the frontend 106 may be inaccessible. The user 102 may be associated with a profile configured to access the frontend 106. The profile may be associated with a single host computer associated with a customer client or a plurality of host computers associated with a customer client.

User 102 may be associated with a person or entity that interacts with web-application 100. User 1002 can be an operator, administrator, end-user, or any other identified role.

Frontend 106 may be configured to interact with backend 112 by sending or receiving information instructions, queries, and responses (e.g., requests, responses). In some embodiments, the instructions may be in the form of application programming interface ("API") instructions or other programming interface instructions. The frontend 106 may allow data and information to be fetched from asynchronous components (e.g., host computers) connected to the network. The frontend 106 may be a user interface. The user interface may be based on a JavaScript library used in web development. Through frontend 106, an operator may track, mark, search, make comments, combine or divide STIGs, group assets, change manual or automatic settings, or execute programs to implement changes for one or more assets or systems connected to the network. A system may be a computer platform, network, or environment that includes one or more assets. An asset may be a configurable item within an information system boundary. An asset may be a physical or virtual piece of hardware or software or could also refer to a part of a system (e.g., a group of computers, hardware, software).

The backend 112 can comprise instructions stored on a non-transitory computer readable medium or distributed across multiple such media, the instructions configured to be executed by a processor. The medium or media may be part of a network computer hosting a virtual server or a network server. The backend 112 may use a Representational State Transfer (REST) framework, such as a Django REST Framework (DRF). Backend 112 may be configured to execute instructions associated with a number of processes 134 that may be associated with a number of functionalities including functionalities associated with software structural components (e.g., parameters, modules, applets, programs, functions, scripts, software methods, files, executables, or other digital information) within a web application such as vulnerability 114, finding 116, STIGs 118, assets 120, accounts 122, checklists 124, and systems 126. Functionalities may include finding data of, displaying data associated for, and storing data associated with the structural components.

Structural component vulnerability 114 may comprise instructions associated with determining, displaying, finding, and receiving information associated with vulnerabilities in the network. A vulnerability may be a weakness in a system because of flawed or incomplete system security processes, internal controls, or implementation that could be exploited or triggered by a threat. The threat may be any circumstance or event with the potential to adversely impact the customer client including the customer client's mission, functionality, reputation, assets, or individuals, where the circumstance or event may be associated with a structural or compatibility issue or a malicious act by an external actor or hacker. Vulnerabilities may be associated with a host computer. Vulnerabilities may be associated with software, hardware, or a combination of software and hardware. Reports of vulnerabilities may be stored on a memory associated with backend 112. STIGs 118 may contain information about potential vulnerabilities. STIGs may be a set of secure configuration guidance for a particular technology area. A result of applying a STIG may be represented by a checklist. Rules within STIGs 118 may be correlated to (e.g., reported or estimated to resolve) certain vulnerabilities. STIGs 118 may also include a severity category (e.g., critical, important, non-critical, etc.). A rule may be an element that holds check information for protocols, settings, and configurations. The rule may be associated with remedial information. A database may include checklists 124 or STIGs 118 that may be used by findings 116 to discover potential vulnerabilities. Backend 112 may be configured to send instructions to mitigate or resolve vulnerabilities within a host computer, software, or hardware by executing instructions to change a configuration, setting, or protocol associated with the vulnerability. For example, backend 112 may include generating a script that includes command-line executables (e.g., batch files) for configuration changes along with a .reg file to update a registry. The registry may include Group Policy updates. The script may be executed on the asset by the backend through a remote connection with the asset. A checklist may include findings or results from applying a STIG to an asset. In some embodiments, an asset may have one or more related checklists, but a checklist may only map to a single asset. This allows, among the other benefits discussed above, changes to large numbers of systems within an organization network in a fast and efficient manner.

Structural component findings 116 may comprise instructions associated with determining, displaying, finding, and receiving information associated with settings, protocols, and host computers in the networks. A finding may be an individual requirement contained within a STIG and may have a status of open, not a finding, not applicable, or not reviewed, among others. A finding may include details and/or comments about the items as it relates to a checklist. Databases for storing findings 116 may be stored on a memory associated with backend 112 or on local memory associated with a host computer. Instructions associated with finding 116 may be used to identify a result or outcome after displaying or correlating results associated with one or more databases including checklists, STIGs, or rules. In some embodiments, findings 116 may use abstracted results. Abstraction may assign or identify information of any element or component relevant to a particular purpose (e.g., searching, filtering, correlating information). In some embodiments finding 116 may use user comments. In some embodiments, finding 116 may compare a state of a system or asset as compared to a checklist, STIG, or user comment to determine whether the system or asset is in compliance with updated, current checklists, STIGs, or rules or is vulnerable. In some embodiments, finding 116 may guide remediation by identifying and/or executing a program associated with resolving compliance or vulnerabilities or displaying results thereof. In some embodiments, finding 116 may guide remediation by identifying and/or executing a program associated with an updated vulnerability, checklist, STIG, or Rule.

Structural component STIGs 118 may comprise instructions associated with determining, displaying, finding, transmitting, and receiving information associated with STIGs. STIGs may be associated with recommended configurations, settings, and/or protocols for software, hardware, and physical architectures, and/or logical architectures. A database including one or more STIGs may be stored on a memory associated with backend 112. STIGs stored on the memory may be periodically updated by receiving updated information from a database.

Structural component asset 120 may comprise instructions associated with determining, displaying, finding, and/or receiving information associated with assets in the network. Each asset may be associated with one or more vulnerabilities, STIGs, checklists, accounts, or users, for example, by identification or abstraction. Assets may refer to one or more host computers, components, software, or hardware within the network or registered in associated within the network. An organization can choose to protect an asset from one or more vulnerabilities and/or choose compliance for system integration and coordination.

Structural component account 122 may comprise instructions associated with determining, displaying, finding, and/or receiving information associated with accounts. Account 122 may include a set of credentials and attributes that allow an operator to access features or data within web-application 100. An account may be associated with a client, a test configuration, or an operator that may be configurable to be associated with one or more host computers. The account may be a user account, a business account, or a temporary account. A user or operator can have one account or multiple accounts. Account 122 may require a password, username, biometric, voice print, token-based, and/or multi-factor authentication from each user. Account 122 may change functionality based on selected settings by a user or an operator. Account 122 may change permissions associated with levels of functionality, where the levels are associated with one or more roles.

Structural component checklist 124 may comprise instructions associated with determining, displaying, finding, and receiving information associated with checklist associated with an account. A database including checklists may be stored on a memory associated with backend 112 or frontend 106 or another accessible memory associated with the network. The checklist may include current information associated with a desired protocol, setting, or configuration of one or more host computers. The checklist may be a structured list that contains information of whether tasks, steps, vulnerabilities, or compliance fulfillment are complete, in-progress, or incomplete. Checklists may be organized by asset, user, groups of assets, software, hardware, or combinations thereof. Checklists may incorporate STIGs, for example, incorporating a STIG identification, incorporating subparts of a STIG identification, or incorporating user comments associated with the STIG identification or subpart of the STIG identification. STIGs may be updated, and changes to STIGs between STIG versions or over a specified time for particular assets, groups of assets, users, software, or hardware may be tracked. Results of such tracking may be stored and/or displayed on frontend 106. In some embodiments, results may be stored on backend 112 and displayed on frontend 106. In some embodiments, checklists 124 may be tracked or correlated across one or more users so that results can be viewed over time, trends may be identified, and/or comments between users can be compared. An authoritative solution may be identified based on the correlation or comparison, for example, based on vulnerabilities of assets or systems that are determined to be resolved because of an executed response or an executed program or portion of a program associated with a response to a particular vulnerability.

Structural component system 126 may comprise instructions associated with determining, displaying, finding, and receiving information associated with one or more virtual networks. Such information may be stored or retrieved from a memory associated with backend 112. System 126 can represent an overall infrastructure or software. System 126 may be associated with one or more processors, one or more programs, and a memory. System 126 can host multiple assets. System 126 can be associated with one or more vulnerabilities, checklists, and/or STIGs by, for example, identification or abstraction. System 126 may be a system including assets that is configurable by backend 112 alone or in conjunction with instructions from frontend 106. System 126 may be a local area network or an intranet. System 126 may be associated with an organization's computer assets.

Although the Django REST framework may be used in some embodiments, other web application frameworks can also be used, such as Play, Angular, Laravel, Express, ASP.NET, Ruby on Rails, METEOR, Spring, CoedIgniter, or similar application frameworks.

Web-application 100 may further comprise a structural component auditor 130. Auditor 130 may interact with structural components finding 116, STIG 118, asset 120, account 122, checklist 124, and system 126 by data capture 128 associated with various other structural components. Auditor 130 may generate audit results 132 based on a comparison of data captures 128 to one or more of past results, expected results, a best practice or policy, whether updates are available, or a review of records associated with the customer client and track when an object is created or updated. The object may be an asset or a finding, consistent with disclosed embodiments. Auditor 130 may send audit results 132 to backend 112. Backend 112 may process data from audit results 132 and determine changes to processes 134 based on audits 132. For example, backend 112 may communicate with structural components 120, 122, 124, and 126 to change a parameter of structural components 120, 122, 124, and 126 based on an error determined based on data from audit results 132.

Figure 2A:
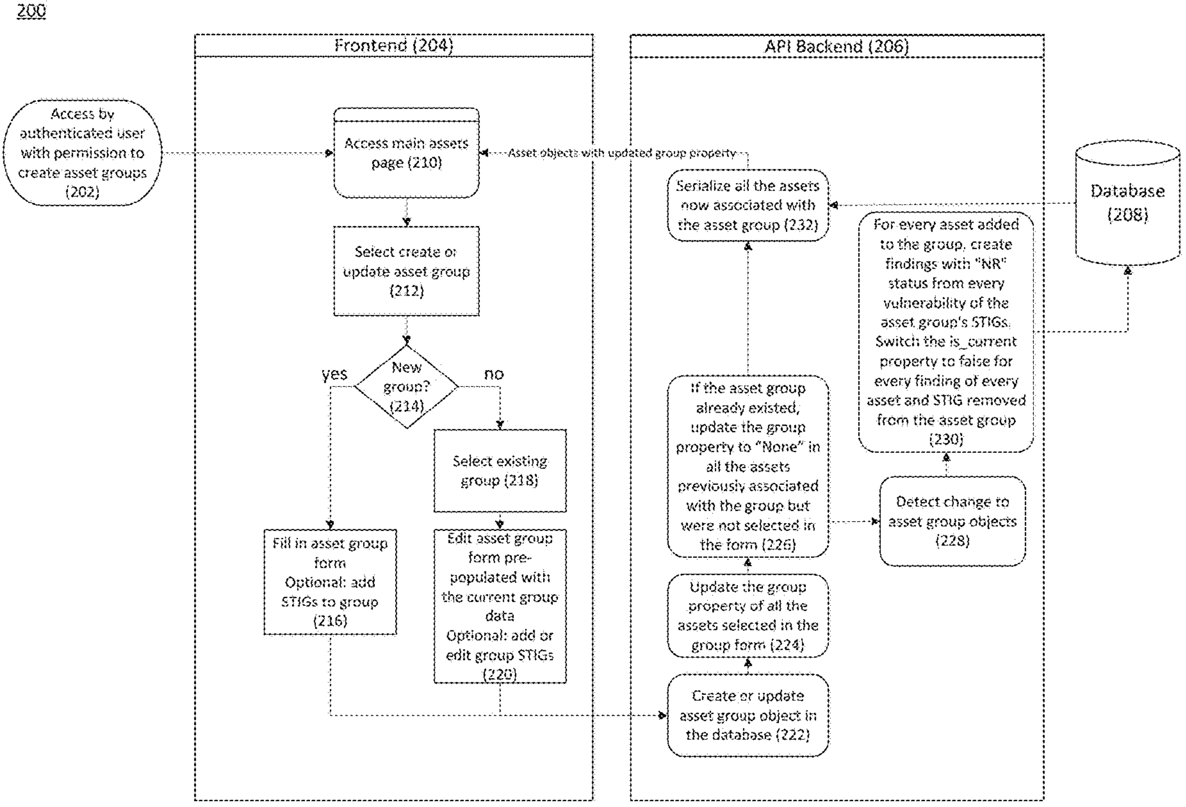
FIGS. 2A-2E illustrate flowcharts of an asset management and control system according to some embodiments of the present disclosure.

FIG. 2A illustrates a flowchart of an asset management and control system according to some embodiments of the present disclosure.

Process 200 may be an asset creation group process. Process 200 may be a process to create a new group or edit existing groups based on detected assets, a determination of a group of assets or findings. Process 200 may include operation of instructions by one or more processors associated with frontend 204 and backend 206. Backend 206 may be configured to access database 208.

Process 200 may include step 202 of access by an authenticated user with permission to create asset groups. The authenticated user may use a user device in connection with frontend 204. In some embodiments, the user device may be part of a system targeted for asset or STIG updates consistent with disclosed embodiments. In step 210, a user interface associated with frontend 204 may be accessed by the user device. The user interface may be a landing page, dashboard, or main assets page.

In step 212, frontend 204 may receive a selection to create or update an asset group. The asset group may be part of the system. In step 214, frontend 204 may determine if a new group has determined or been selected 214. In step 216, if yes, then frontend 204 may fill in an asset group form based on detected system software and/or add STIGs to the asset group based on the type of operating system, hardware, or one or more applications operated on the asset group or as otherwise disclosed herein. Frontend 204 may display an asset group form to a user and/or applicable STIGs. This aids efficient review. It is also contemplated the user may fill in the asset group form and/or add STIGs to an asset group. Furthermore, updated STIGs, hardware or software listings, port or IP addresses, or asset modifications may automatically trigger updates to the asset group including a re-grouping of assets. For example, an asset modification of an existing configuration may place the asset in a new category of assets. As another example, the asset modification may generate a compliance alert if it violates one or more rules of a STIG assigned to the asset.

In some embodiments, periodic patch scans of STIGs may be performed to determine whether assets include any new vulnerabilities, for example because previous STIGs did not include those vulnerabilities. In some embodiments, the periodic patch scans may be used to determine that a previous response to a STIG is still sufficient to bring the asset into compliance.

In step 218, if no new group is determined or input, one or more existing assets groups may be selected. The asset groups may be selected iteratively until all asset groups have been selected. In step 220, an asset group form may be retrieved and/or pre-populated with the existing asset group details and/or STIGs for the existing asset group.

In step 222, backend 206 may create or update an asset group object in the database. In step 224, backend 206 may update a group property of the assets selected or determined to be part of the asset group. In step 226, if the asset group already existed, a group property may be updated to "none" in all assets previously associated with the asset group but not selected in the asset group form. In step 228, backend 206 may detect a change to asset group objects. In step 230, for each asset added to the asset group, findings may be created by backend 206 and the findings may be labeled "not reviewed" so that backend 206 may make updates then or at a future time. The "not reviewed" labels may also be displayed to the user through the user interface. Step 230 may also include switching a current property to false for every finding of every asset and removing a STIG from the asset group. The results of step 230 may be stored in database 208 for future reference.

In step 232, the assets now associated with the asset group may be serialized, and the asset group may be displayed to the user through the user interface. In this way, a status of the asset group may be consistently tracked.

Figure 2B:
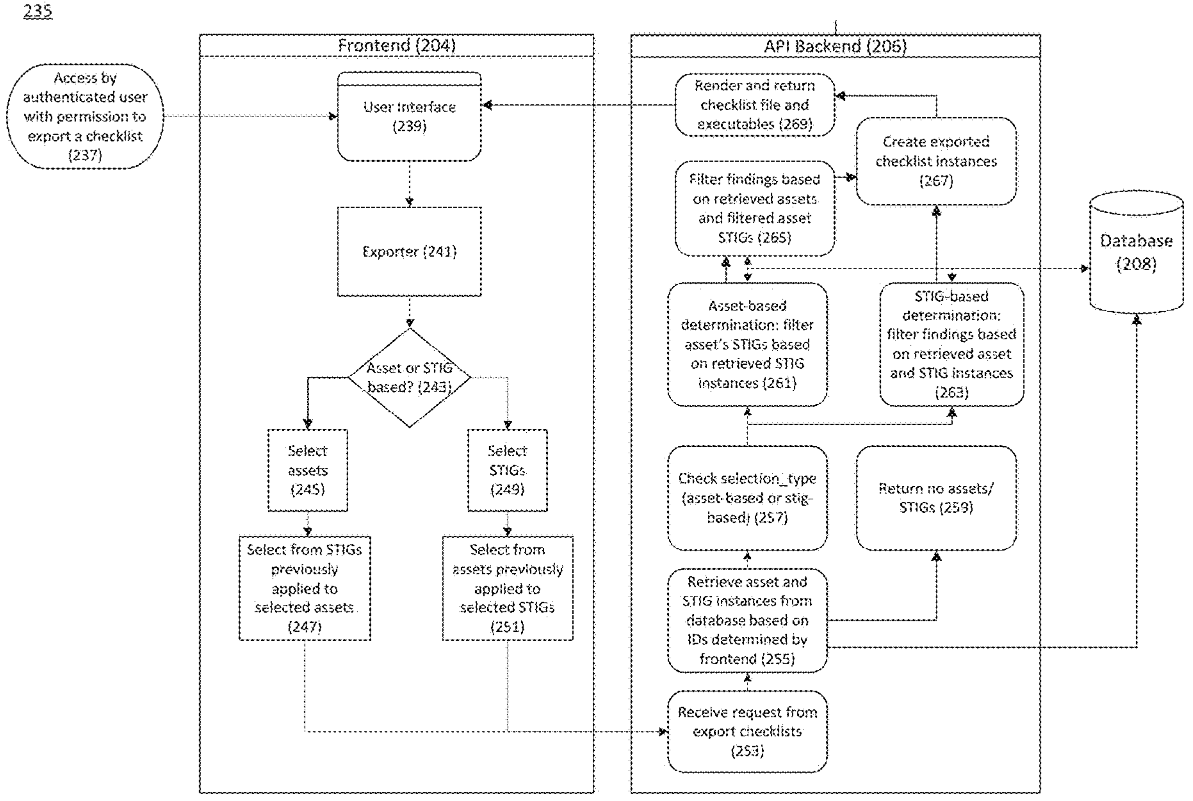

FIG. 2B illustrates a flowchart of an asset management and control system according to some embodiments of the present disclosure.

Process 235 may be a checklist exportation process. Process 235 may include access of frontend 204, backend 206, and database 208 as discussed above.

In step 237, an authenticated user may access frontend 204 if the authenticated user has permission to export a checklist. In step 239, a user interface may be accessed by the authenticated user. In step 241, an exporter 241 may be referenced by user interface 239. The exporter 241 may retrieve one or more STIGs based on an asset or a list of assets based on a STIG, consistent with embodiments discussed above. In step 243, the frontend 204 may determine whether to access a list of assets to determine an asset to begin with or to access a STIG that applies to one or more assets of the system. In some embodiments, frontend 204 may determine based on an update to an asset and/or a STIG. In some embodiments, frontend 204 may prioritize STIGs marked as high priority or assets that are considered compromised. In some, embodiments, frontend 204 may prioritize a STIG based on a number of affected assets.

In step 245, if the STIG is selected, then associated assets referenced by the STIG or determined to be affected by the STIG are selected. In step 247, the STIGS previously applied to the selected assets may be selected.

In step 249, if the asset is selected, then associated STIGs referencing one or more assets or affected assets are selected. In step 251, the assets previously affected by the STIGs may be selected.

In step 253, a request may be determined by backend 206 from the one or more checklists from the exporter. In step 255, backend may retrieve one or more asset and/or STIG instances from database 208 based on identifications determined by a frontend. In step 259, if no assets or STIGs are returned based on the identifications, the process may end. In step 257, if assets or STIGS are identified based on the identifications, the type of selection (asset or STIG) may be checked. In step 261, if the type of selection is asset-based, then an asset's STIGs may be filtered based on retrieved STIG instances. In step 265, findings may be filtered based on retrieved assets and/or filtered asset STIGs. In step 263, if the type of selection is STIG-based, then findings may be filtered based on one or more of a retrieved asset instance a received STIG instance. Steps 261, 263, and 265 may reference database 208 for retrieved STIG and/or asset instances.

In step 267, backend 206 may create exported checklist instances. In step 269, backend 206 may render and return checklist file and executables for adjusting configurations consistent with disclosed embodiments. The results of step 269 may be provided to the user interface 239.

Figure 2C:
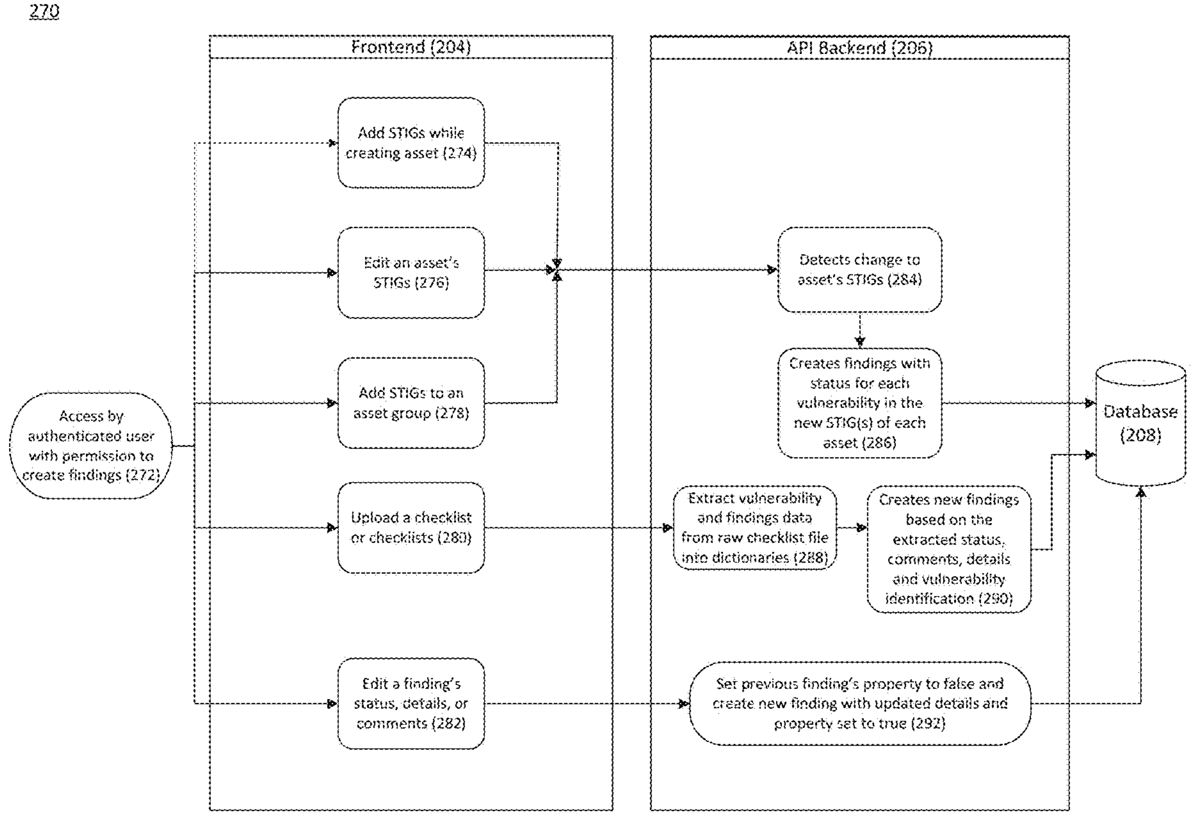

FIG. 2C illustrates a flowchart of an asset management and control system according to some embodiments of the present disclosure.

Process 270 may be a finding creation process. Process 270 may include access of frontend 204, backend 206, and database 208 as discussed above.

In step 272, a user may access a frontend 204 if the user has permission to create findings. In step 274, frontend 204 may determine one or more STIGs for an asset once an asset is added. The asset may be added manually or found on a network. In some embodiments, the asset may be determined by a response by the asset to a ping for assets connected in the system.

In step 276, an asset's STIGs may be edited. For example, STIGs may be added, deleted, or modified (e.g., a goal compliance standard, a comment, etc.).

In step 278, STIGs may be added to an asset group as discussed above. In step 280, a checklist or checklists may be uploaded. In some embodiments, an update to a checklist may trigger a checklist upload (e.g., from a repository of checklists). This may be part of continuous monitoring of checklists to determine if assets need to be updated based on any update to any finding.

In step 282, a finding's status, details, or comments may be edited. The edits may be seen by any user accessing frontend 204.

In step 284, backend 206 may detect changes to an asset's STIGs. For example, a previous STIG may be compared to a new STIG. Old and new STIGs may be differentiated by titles, a date associated with the STIG, or a content of the STIG.

In step 286, backend 206 may create findings with a status for each vulnerability in the new STIG of each asset. These findings may be stored in database 208.

In step 288, backend 206 may extract vulnerability and findings data from a raw checklist file (e.g., from step 280) and convert them using a dictionary such as Python. In step 290, backend 206 may create new findings based on identification of an extracted status, comments, details, and/or vulnerabilities of the checklist. The results may be stored in database 208.

In step 292, backend 206 may set a previous finding's property, that has been edited, to false and create a new finding with updated edited details and set the finding's property to true. The results may be stored in database 208.

Figure 2D:
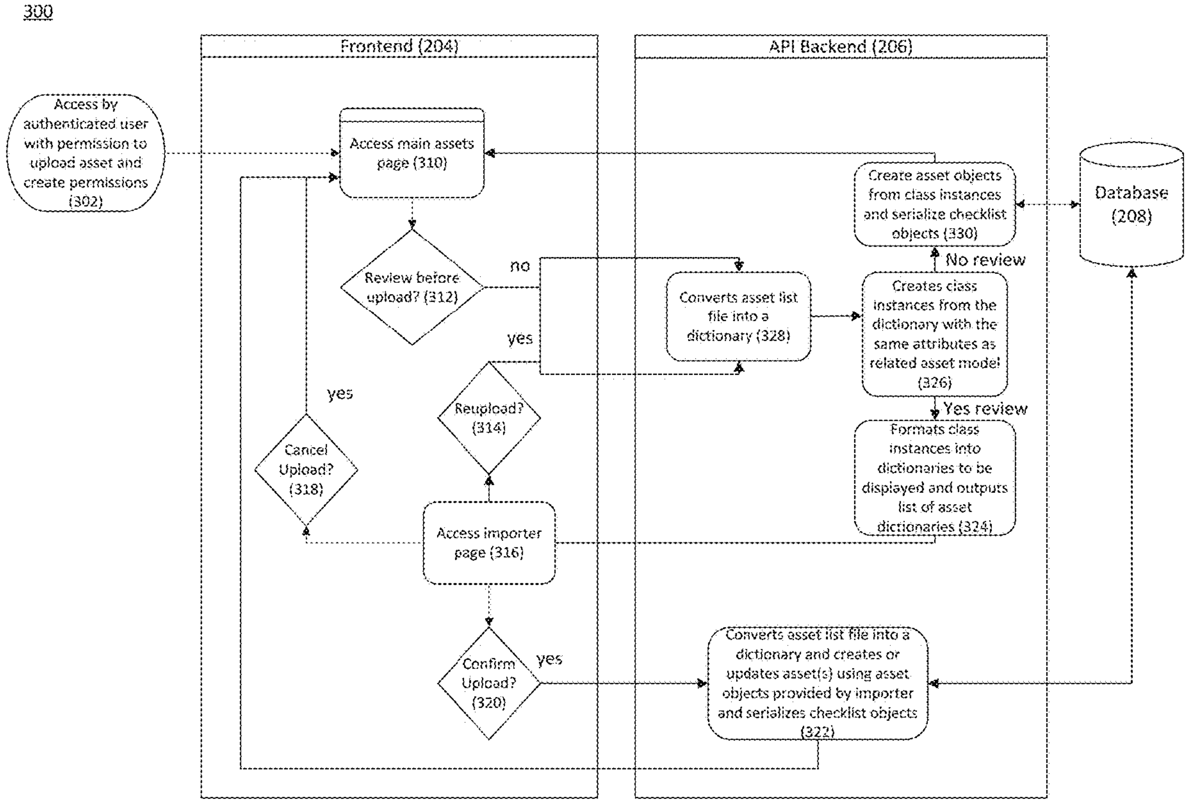

FIG. 2D illustrates a flowchart of an asset management and control system according to some embodiments of the present disclosure.

Process 300 may be an asset upload and permission creation process. Process 300 may include access of frontend 204, backend 206, and database 208 as discussed above. Process 300 may allow a user to add new assets manually or through detection of connected devices of an organization's network.

In step 302, a user with permission to upload an asset and create a permission may access frontend 204. In step 310, a main assets page, dashboard, or other user interface may be accessed. In step 312, a user may select through frontend 204 whether to discover assets (e.g., through a ping of connected devices in the organizational network), what asset to upload, and/or whether they want to review an asset before it is uploaded. In step 328, the asset or group of assets may be converted from an asset list using a dictionary, such as Python. In step 326, backend 206 may create class instances from the dictionary, wherein each class instance of the uploaded asset is set based on a related or previously known asset model. In the case of no related or previously known asset model, the class instance may be left blank.

In step 330, in the case of a selection of "no review" or similar, backend 206 may create asset objects from class instances and serialize checklist objects. Results of step 330 may be published to database 208 and provided to page 310 for display.

In step 324, in the case of a selection of "yes review" or similar, backend 206 may format class instances of the uploaded asset(s) into dictionaries to be displayed and output a list of asset dictionaries. In step 314, the user may be allowed to re-upload or edit an asset, for example, if a an error was made during detection or input. In step 316, the results of step 324 may be published on an access importer page for review of a user. In step 318, the user may cancel the upload, and the asset may not be uploaded. In step 320, the upload may be confirmed, and the asset(s) list file may be converted into a dictionary and assets may be created or updated using objects (i.e., assets, STIGs, and findings) provided by an importer. In some embodiments, a checklist or the objects may be created based on checklists found in response to any update to the checklist on a checklist repository. Further, the checklist objects may be serialized and stored in database 208. The results of step 322 may be displayed at a user interface.

Figure 2E:
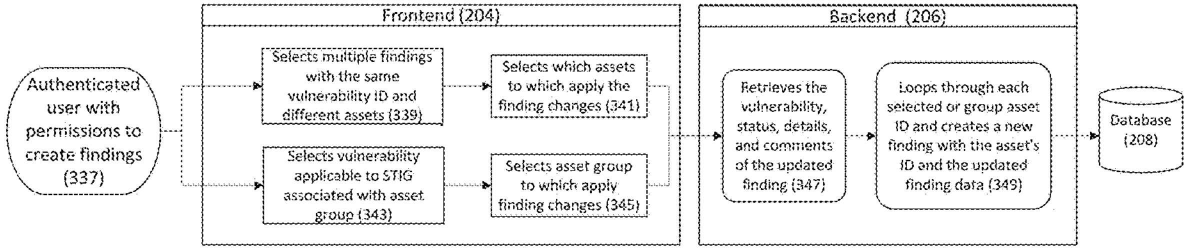

FIG. 2E illustrates a flowchart of an asset management and control system according to some embodiments of the present disclosure.

Process 335 may be an bulk findings creation process. Process 300 may include access of frontend 204, backend 206, and database 208 as discussed above.

In step 337, an authenticated user with permissions to create findings may access frontend 204. In step 339, frontend 204 may select multiple findings the same vulnerability identification and with different assets. In step 341, frontend 204 may select assets to which the findings changes should be applied. The results may be passed to step 347.

In step 343, frontend 204 may select a vulnerability applicable to a STIG associated with an asset group. In step 345, frontend 204 may select assets/an asset group(s) to which the findings changes should be applied. The results may be passed to step 347.

In step 347, backend 206 may retrieve the vulnerability, status, details, and/or comments of the updated finding. In step 349, backend 206 may loop through each selected or grouped asset identification and/or create a new finding with the asset's identification and the updated finding data. Results may be stored in database 208.

Figure 3:
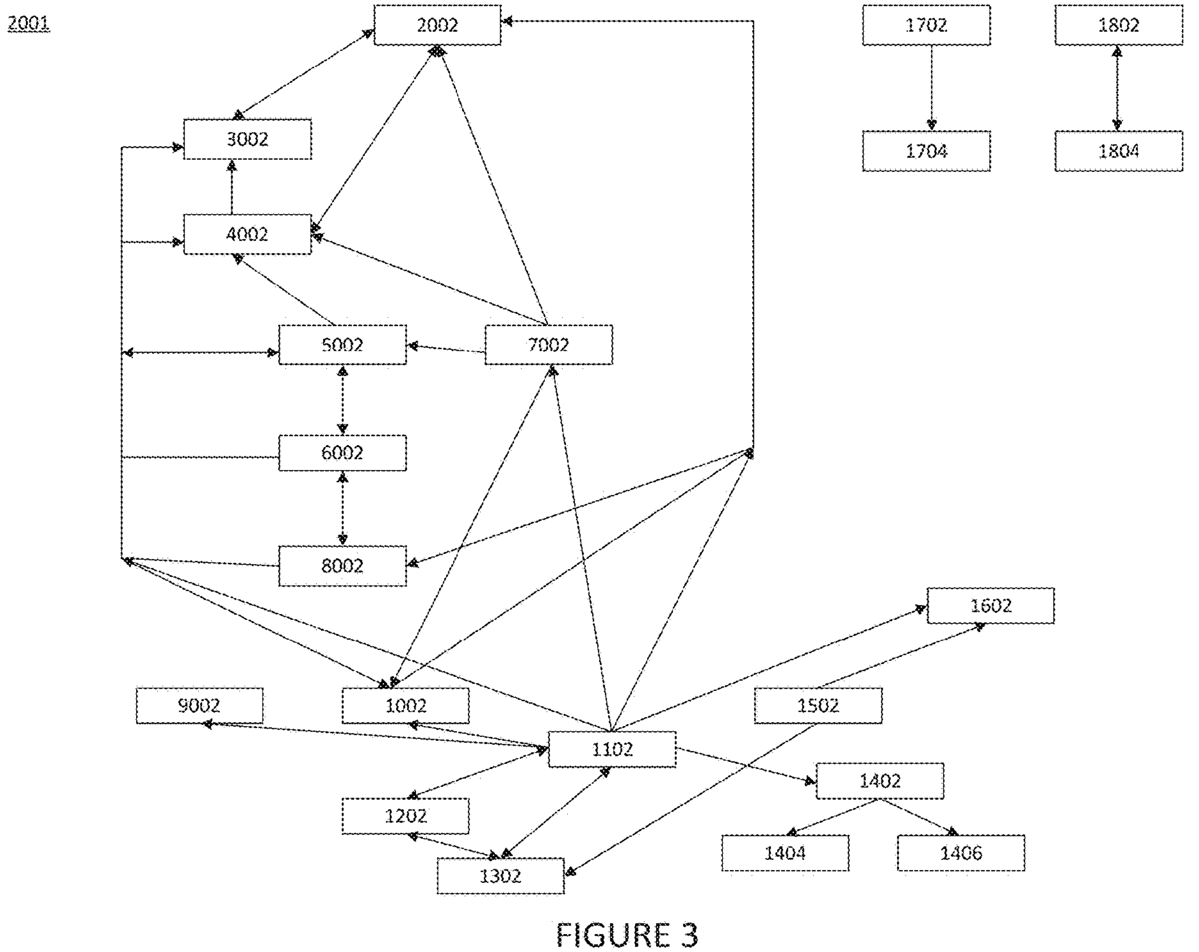
FIG. 3 illustrates a schematic of components within an asset management and control system according to some embodiments of the present disclosure.

FIG. 3 illustrates a schematic of an asset management and control system according to some embodiments of the present disclosure.

System 2001 may comprise structural components checklist 2002, findings 3002, asset 4002, asset group 5002, STIG 6002, system 7002, vulnerability 8002, auditlog 9002, auditable model 1002, user 1102, group 1202, permission 1302, abstract user 1402, content type 1502, log entry 1602, and session 1702, base session 1704, control correlation identifier (CCI) 1802, and references 1804.

Session 1702 may be a set of configurations of preferences and entries based on a current session of a user. Base session 1704 may be a set of configurations of a backend and a frontend used when no configurations of preferences and entries have been set (e.g., for a new customer client). CCI 1802 may be configured to provide a standard identifier and description for a list of individual actionable statements that can be used to control information architecture. For example, CCI 1802 may include commands that are associated with how high-level policies are to be implemented in certain low-level settings. CCI 1802 may be configured to track which low-level settings result from which high-level policies and which implementations are successful (e.g., satisfy one or more policy parameters), so that remedial actions may be identified or modified based on a current status and past successful remedial actions. References 1804 may be a number of security controls, privacy controls, and severity levels. CCI 1802 and References 1804 may correlate (e.g., determine relationships between) low-level settings and security controls, privacy controls, and severity levels.

FIG. 3 illustrates schematics of components within a protocol management and control system according to some embodiments of the present disclosure. A processor can be configured to operate instructions executable to perform operations associated with structural components 2002, 3002, 4002, 5002, 6002, 7002, 8002, 9002, 1002, 1102, 1202, 1302, 1402, 1502, 1602, 1702, and 1802 as described herein.

Checklist system 2002 may include structural component checklist. Checklist 2002 may output an abstract inheritance for an auditable model system 1002. Checklist 2002 may send data to and receive data (e.g., determinations of whether the checklist includes findings based on keywords, categories, or abstractions) from finding structural component 3002. Checklist 2002 may send data to and receive data (e.g., host computer, hardware, or software characteristics) from asset structural component 4002. Checklist 2002 may send data to and receive (e.g., updates to checklist) from STIG structural component 6002. Checklist 2002 may receive (e.g., system information) from system structural component 7002. Checklist 2002 may send data to and receive data (e.g., identification of vulnerabilities) from vulnerability structural component 8002. Checklist 2002 may receive data (e.g., user information) from user structural component 1102.

Checklist system 2000 may include structural component finding 3002. Finding 3002 may send data to and receive data (e.g., whether information is found within the checklist) from checklist structural component 2002. Finding 3002 may receive data (e.g., whether vulnerabilities are determined) from vulnerability structural component 8002. Finding 3002 may receive data (e.g., asset information) from asset structural component 4002.

Checklist system 2000 may include structural component asset 4002. Asset 4002 may send data to structural component finding 3002. Asset 4002 may send data to and receive data (e.g., checklist information tracking information for each asset) from checklist structural component 2002. Asset 4002 may receive data (e.g., user information associated with each asset) from a user structural component. Asset 4002 may send data (e.g., asset information) to auditable model structural component 1002. Asset 4002 may send data to and receive data (e.g., STIG information associated with each asset) from STIG structural component 6002. Asset 4002 may receive data (e.g., groups of assets based, for example, on like software or hardware) from asset group structural component 5002. Asset 4002 may receive information (e.g., systems used) from a system structural component.

Checklist system 2000 may include structural component asset group 5002. Asset group 5002 may send data to asset structural component asset 4002. Asset group 5002 may send data to auditable model structural component 1000. Asset group 5002 may send data to and receive data (e.g., STIG information associated with each asset group) from STIG structural component 6002. Asset group 5002 may receive data (e.g., user information) from user structural component 1102. Asset group 5002 may receive data (e.g., system information) from system structural component 7002.

Checklist system 2000 may include structural component STIG 6002. STIG 6002 may send data to and receive data (e.g., asset information associated with each STIG) from asset 4002. STIG 6002 may send data to and receive data (e.g., asset group information associated with each STIG) from asset 5002. STIG 6002 may send data (e.g., STIG information) to auditable model structural component 1000. STIG 6002 may send data to and receive data (e.g., vulnerabilities associated with each STIG) from vulnerability structural component 8002. STIG 6002 may and receive data (e.g., user information associated with each STIG) from user structural component 1102.

Checklist system 2000 may include structural component system 7002. System 7002 may send data (e.g., system information) to asset group structural component 5002. System 7002 may send data (e.g., system information) to asset structural component 4002. System 7002 may send data (e.g., information for a checklist of each system) to checklist structural component 2002. System 7002 may send data (e.g., information for each system) to auditable model structural component 1000. System 7002 may receive data (e.g., information for a user) from user structural component 1102.

Checklist system 2000 may include a structural component of vulnerabilities 8002. Vulnerabilities 8002 may send data (e.g., vulnerabilities) to finding structural component 3002. Vulnerabilities 8002 may send data to and receive data (e.g., STIGs associated with vulnerabilities) from STIG structural component 6002. Vulnerabilities 8002 may send data to and receive data (e.g., STIGs associated with vulnerabilities) from STIG structural component 6002. Vulnerabilities 8002 may send data (e.g., vulnerability audit information) to auditable model structural component 1002. Vulnerabilities 8002 may receive data (e.g., STIGs associated with vulnerabilities) from user structural component 1102.

Checklist system 2000 may include audit log 9002. Audit log 9002 may receive data (e.g., user information) from user structural component 1102.

Checklist system 2000 may include structural component auditable model 1002. Auditable model 1002 may receive data (e.g., checklist information including determinations of matches or non-matches) from checklist structural component 2002. Auditable component 1002 may receive data (e.g., asset information audits) from asset structural component 4002. Auditable component 1002 may receive data (e.g., asset group information audits) from asset group structural component 5002. Auditable component 1002 may receive data (e.g., STIG information audits) from STIG structural component 6002. Auditable component 1002 may receive data (e.g., vulnerability information audits) from vulnerability structural component 8002. Auditable component 1002 may receive data (e.g., system information audits) from system structural component 7002. Auditable component 1002 may receive data (e.g., one or more user information audits) from system structural component 1102.

Checklist system 2000 may include structural component user 1102. User 1102 may send data to and receive data (e.g., group information) from group structural component 1202. User 1102 may send data to and receive data (e.g., permission information for each user) from permission structural component 1302. User 1102 may send data (e.g., user information) to abstract user structural component 1402. User 1102 may send data (e.g., user information) to log entry structural component 1602.

Checklist system 2000 may include structural component group 1202. Group 1202 may send data to and receive data (e.g., user information) from user structural component 1102. Group 1202 may send data to and receive data (e.g., permission information for each group) from permission structural component 1302.

Checklist system 2000 may include structural component permission 1302. Permission 1302 may send data to and receive data (e.g., group information) from group structural component 1202. Permission 1302 may send data to and receive data (e.g., user information) from user structural component 1102. Permission 1302 may receive data (e.g., types of content that may be permitted) from content type structural component 1502.

FIG. 3M illustrates abstract user system 1400 including structural component abstract user 1402. Abstract user 1402 may receive data (e.g., user information in order to create an abstraction) from user structural component 1102. Abstract user 1402 may send data (e.g., abstract user information in order to create base permissions) to permission mix structural component 1404. Abstract user 1402 may send data (e.g., user information in order to create an abstract base user) to abstract user base structural component 1406.

Checklist system 2000 may include structural component content type 1502. Content type 1502 may send data (e.g., content types, each of which can have a permission) to permission structural component 1302. Content type 1502 may send data (e.g., content types to be logged) to log entry structural component 1602.

Checklist system 2000 may include structural component log entry 1602. Log entry 1602 may receive data (e.g., user information) from user structural component 1102. Log entry 1602 may receive data (e.g., content type information) from log entry structural component 1602.

The changes a user or operator makes to any checklist, comments, or other elements consistent with disclosed embodiments may be stored in relation to a session (see, e.g., 1702). Once a change is made to any session, it may be stored separately from a base station (see, e.g., 1704). The session may be saved in relation to a particular user, a particular timeframe, and/or particular versions of software and hardware.

Any structural component discussed herein may use CCI (1802) and references (1804) to determine current settings, protocols, and configurations. CCI (1802) and references (1804) may be used to access current nomenclature, to check for updates, and/or to generate parameters for determined executable programs.

A common client interface may be created for each use of the system. The common client interface may incorporate a status associated with a user and/or the current system. The common client interface may reference a reference database for parameters of the common client interface.

Figure 4A:
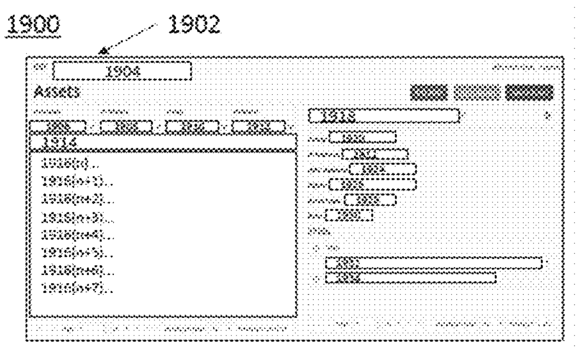
FIGS. 4A-4F illustrate a user interface of a protocol management and control system according to some embodiments of the present disclosure.

FIGS. 4A-4F illustrate a user interface of a protocol management and control system according to some embodiments of the present disclosure. FIG. 4A illustrates an assets tab 1902 of a web-application 1900. Assets tab 1902 may include a menu 1904 to access other tabs discussed herein. Assets tab 1902 may include search functions 1906, 1908, 1910, and 1912 to search among different assets 1916 within the network. Search function 1906 may search or filter based on a hostname (e.g., a name a client user provides to a single computer or system). Search function 1908 may search or filter based on an IP address. Search function 1910 may search or filter based on a group designation. Search function 1910 may search or filter based on an asset type, role, or STIG. Search function 1912 may search or filter based on a nickname. Display bar 1914 may display a selected asset from the list of assets 1916(*n*), 1916(*n*+1), etc.

A selected asset can be displayed in a detailed view. Detailed view display bar 1918 can display the name of the asset. The detailed view may list other details including the group 1920, IP address 1922, MAC address 1924, full computer name (e.g., FQDN) 1926, asset type 1928 (e.g., computing, communication, or similar), and role 1930. The detailed view may show STIGs appropriate to the selected assets (e.g., STIGs that are unresolved/open or associated with vulnerabilities), or the user may be able to search for a STIG 1932 and be able to access STIG details 1934.

Figure 4B:
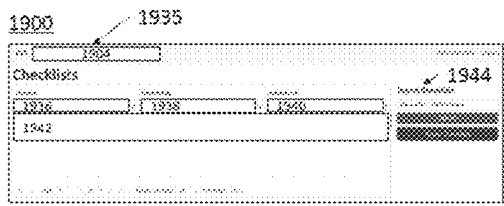

FIG. 4B illustrates an exemplary checklists tab 1935 of a web-application 1900. Checklists tab 1935 may include a menu 1904 to access other tabs discussed herein. A database with checklists can be searched or filtered through search functions including by filename 1936, author 1938, and date 1940. For example, checklists can be searched or filtered by filename 1936, by author imported by 1938, or by date imported on 1940. Checklists can be displayed in checklist list 1942. Import checklists view 1944 is configured to allow a user to upload or export a checklist (e.g., to be stored on a frontend or backend).

Figure 4C:
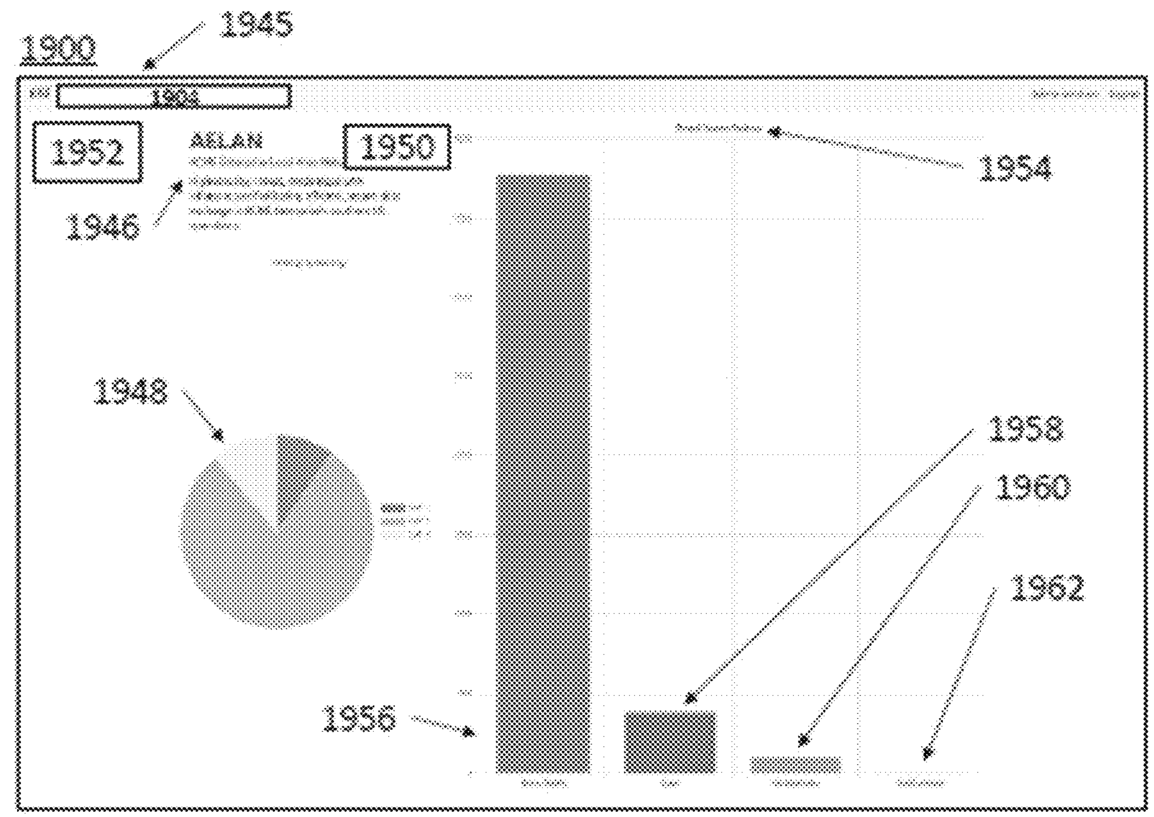

FIG. 4C illustrates an exemplary dashboard tab 1945 of a web-application 1900. Dashboard tab 1945 may include a menu 1904 to access other tabs discussed herein. Dashboard tab 1945 can include a system selection menu 1952 where any system associated with the account may be selected. Dashboard tab 1945 may display system information 1946. Dashboard tab 1945 may show a diagram displaying the number of unresolved STIGs or Rules and their associated severity (e.g., machine-predicted extent of security risk based on likelihood of danger and/or value of the asset or system at risk, or appointed standard based on reports of severity). Dashboard tab 1945 may display findings graph 1954. Dashboard tab 1945 can include actions tab 1950 where a user may edit the displayed system or add/remove a system from the displayed data in the dashboard page (e.g., findings graph 1954). Findings graph 1954 may display non-adverse findings (e.g., no finding) data 1956, open issues 1958, non-applicable STIGs or Rules 1960, and not reviewed/no determination STIGs and/or Rules 1962.

Figure 4D:
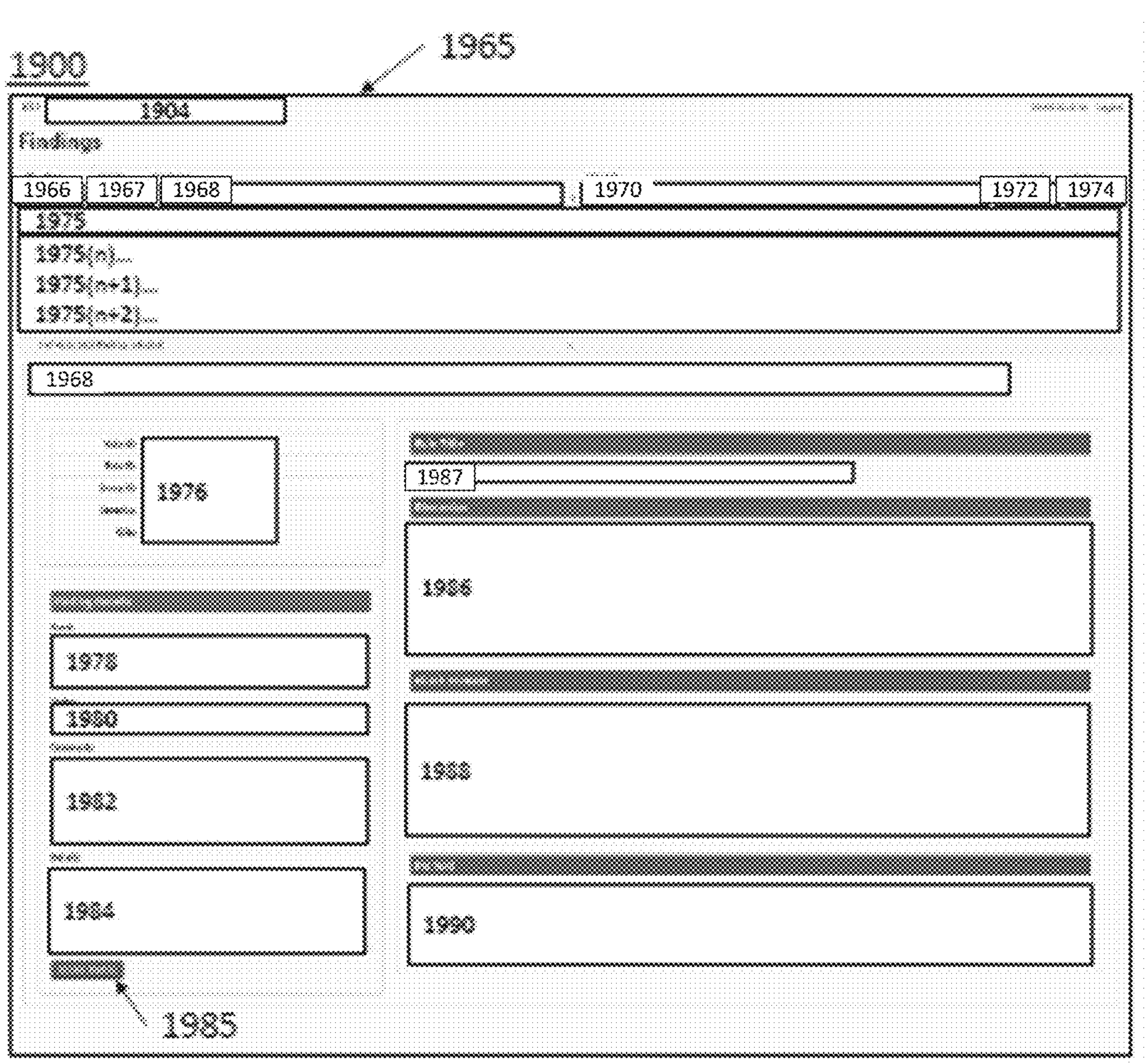

FIG. 4D illustrates an exemplary findings tab 1965 of a web-application 1900. Findings tab 1965 may include a menu 1904 to access other tabs discussed herein. Findings tab 1965 may include search functions 1966, 1967, 1968, 1970, 1972, and 1974. Findings may be searched or filtered according to a host of the findings 1906, a vulnerability identification 1967, a STIG name 1968, a Rule 1970 (e.g., a text of a Rule), a severity 1972, and/or a status 1974 (e.g., no finding, open/unresolved, not applicable, not reviewed/no determination). A selected finding may be shown in display bar 1975. A list of findings may be shown as list 1975(*n*), 1975(*n*+1), etc. A selected finding may be displayed in a display view. The selected finding title may be displayed in display bar 1968. Details of the finding may be displayed in details view 1976 including vulnerability identification, Rule identification, Group identification, severity, or CCIs.

Further finding details may be shown and interacted with in relation to assets 1978, status 1980, comments 1982, and details 1984. Assets 1978 may list assets related to the selected finding. The status 1980 of the finding may be shown. The comments 1982 may be displayed or entered. The details 1984 may be displayed. Once selections are made, a processor associated with a web-application may be configured to receive a user or operator update of the finding with updated information so the database can be searched for or by the updated information (e.g., the selections may be a digital condition according to which updates are permitted). A graphical user interface 1985 may be pressed to input the finding. Findings details may include what responses were determined and/or implemented, what assets the responses relate to, and/or the success of the responses.

A Rule associated with the selected finding may be displayed in a Rule viewer. The Rule title 1987 may also be displayed. The Rule discussion 1986 may display recorded information from checklists, the host (e.g., host entity), or determined responses for how to process a particular Rule. The Rule content 1988 may display recorded information from checklists or the host for parameters or aspects of the system to be changed or fixed. The Fix text 1990 may display a proposed response including code such as computer code or source code to be implemented or parameters to be input into an executable code or program.

Figure 4E:
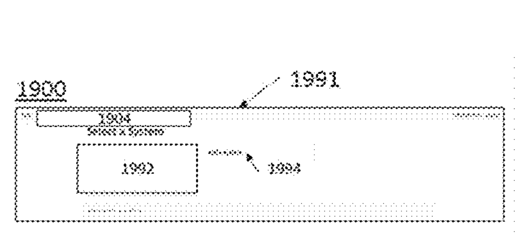

FIG. 4E illustrates a system tab 1991 of a web-application 1900. System tab 1991 may include a menu 1904 to access other tabs discussed herein. System 1991 may include a displayed system 1992. One or more systems may be shown. System display 1992 may include a name, title, nickname, or other identifying information of a system. Function 1994 may be used to add a system including identifying the system or connecting to the system to determined connected assets.

Figure 4F:
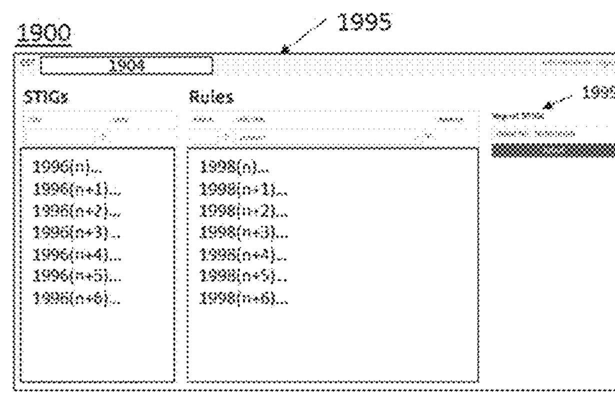

FIG. 4F illustrates a STIGs and/or Rule tab 1995 of a web-application 1900. STIGs and/or Rule tab 1995 may include a menu 1904 to access other tabs discussed herein. A STIGs viewer may list STIGs (e.g., 1996(*n*), 1996(*n*+1), etc.) that are searchable or filterable based on name and/or date. A Rule viewer may list Rules (e.g., 1998(*n*), 1998(*n*+1), etc.) that are searchable or filterable based on vulnerability identification, rule title, and/or severity. An import viewer 1999 may be used to import STIGs or Rules.

Figure 5:
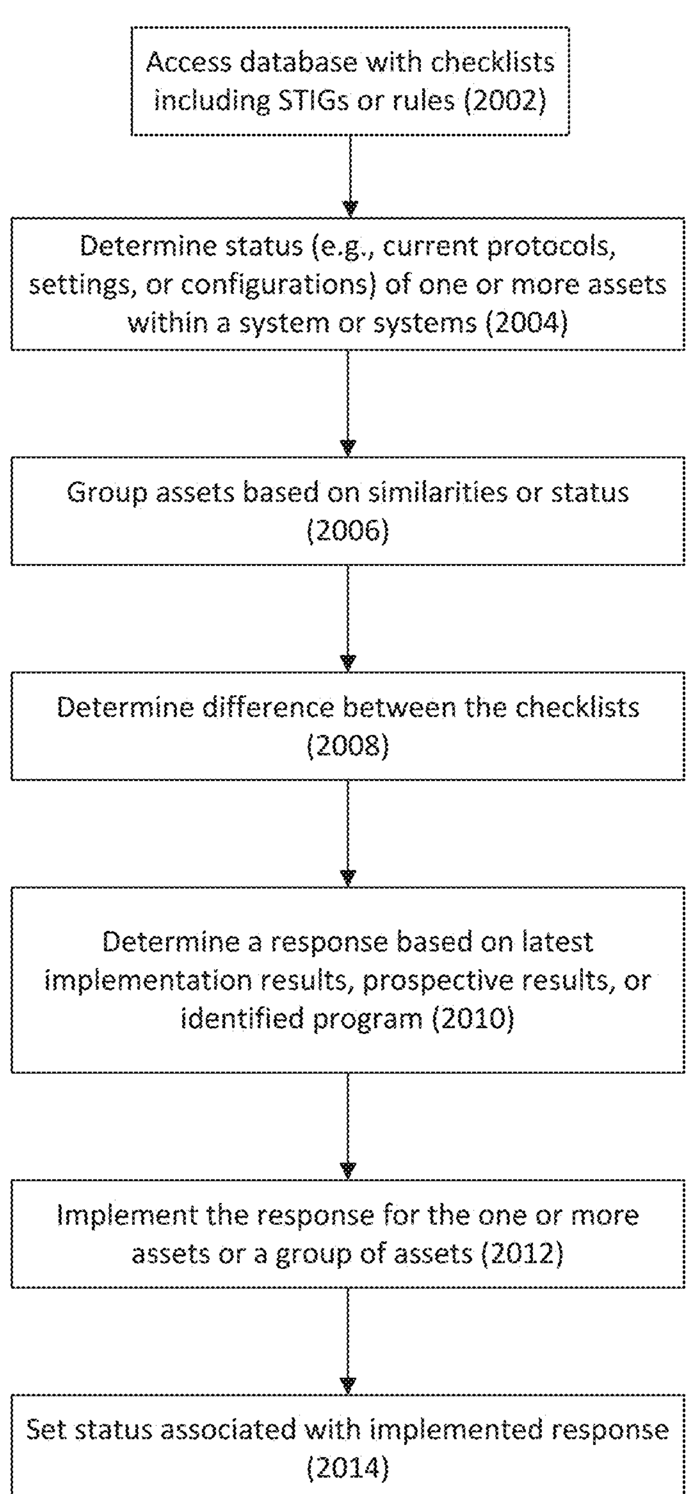
FIG. 5 illustrates a schematic of an asset management and control system according to some embodiments of the present disclosure.

FIG. 5 illustrates an exemplary schematic of an asset management and control system according to some embodiments of the present disclosure. A method of the asset management and control system 2001 can include one or more of the steps shown in FIG. 5. As an example, in some embodiments, the steps may include one or more steps of determining assets or a group of assets of an organization network, running a STIG analysis tool, exporting a compliance scan result and loading it to an asset protection program, determining deficiencies by comparing a rule in the STIG to a configuration setting, creating a script to address the deficiency to change the configuration setting to match the rule, exporting the script to the asset, executing the script on the asset, and re-running the STIG analysis tool to ensure the configurating setting is changed and satisfies the rule. Optionally, the asset may be reboot if applicable. For example, a task management program may be used by attackers to run malicious programs (e.g., ransomware) to attack a file system, registry, and more, and a STIG can include a rule to disable the task management program. An asset or asset group may be detected by an asset management program as having the task management program enabled, and the above process may be enacted through the asset management program to change the configuration of the task management program on the asset or asset group.

A method of the asset management and control system 2001 may be initialized by a processor of a network, comprising a network memory or connected to a network memory, accessing instructions stored on the memory, where the processor is configured to execute the instructions to access a database 2002 with checklists. In some embodiments, the processor may be configured to execute the instructions to access a database with STIGs and/or Rules. In some embodiments, in a host computer or a system computer connected to the network, the host computer or a system computer can comprise a non-transitory computer-readable medium comprising instructions executable by a processor to determine a status 2004 of one or more assets or a system. The status may include current protocols, settings, or configurations of the one or more assets or the system.

In some embodiments, the processor may be configured to execute instructions to group one or more assets 2006 based on similarities (e.g., common parameters or attributes satisfying one or more thresholds) or status. In some embodiments, the processor may be configured to execute instructions to determine a difference between an asset status and the checklist, STIGs, and/or Rules 2008. In some embodiments, the processor may be configured to execute instructions to determine a response 2010 based on one or more implementation results, prospective results, an authoritative implementation result, or an identified program. In some embodiments, the processor may be configured to execute instructions to implement the response for the asset, system, or group of assets 2012. In some embodiments, the processor may be configured to determine and set a status associated with the asset, system, or group of assets after the response is implemented 2014. In some embodiments, the method 2001 may return to step 2004 after step 2014 to repeat steps 2004 through 2014 to ensure updates are implemented in the assets or system. It is appreciated that this combination of dynamic approach, which implements a solution rooted in computer technology rather than simply following rules, contributes to solving the complex problems of security, compatibility, and usability in the realm of computer networks.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. In particular, aspects of the present disclosure have been described as relating to systems and methods for providing environment and network control. Additionally, other equivalent methods or composition to these described aspects are also contemplated by the teachings herein. Therefore, the present disclosure should not be limited to any single aspect, but rather construed in breadth and scope in accordance with the appended claims.

What is claimed is:

1. An asset control and management system comprising:

a network comprising a network memory and a network server with access to the network memory; and a host computer connected to the network, the host computer comprising a non-transitory computer-readable medium comprising instructions executable by at least one processor to:

operate, after authentication of an asset, a management program associated with a web-application accessible through a web browser configured to access a checklist stored in the network memory, wherein the asset is a computer connected to the network;

determine a status of the asset, wherein the status includes one or more of a current protocol, a setting, and a configuration of the asset;

determine a difference between the status and the checklist;

receive, from a network database associated with the network memory, an executable program associated with a response, the executable program comprising a script that includes command-line executables for configuration changes along with a reg file to update a registry, wherein the registry includes Group Policy updates; and implement the response within the asset by exporting the script to the asset, adjusting a configuration setting associated with the difference by executing the script on the asset through a remote connection with the asset, and set the status associated with the asset after the response is implemented.

2. The asset control and management system of claim 1, wherein the script is executed on the asset through the remote connection with the asset to change one or more of the configuration, the setting, and the current protocol, the one or more of the configuration, the setting, and the current protocol being associated with a vulnerability determined based on the difference.

3. The asset control and management system of claim 1, wherein the management program is configured to communicate, through an application programming interface, with a backend service executed by the network that transmits the response to the asset, causes execution of the executable program on the asset to adjust the setting associated with the difference, receives execution-status data from the asset indicating whether the setting was changed, and displays, via a graphical user interface viewable on a display connected to the network, the execution-status data.

4. The asset control and management system of claim 3, wherein the graphical user interface is configured to report an update to the response associated with a compliance event by storing, in a database, a finding's status, details, or comments that have been edited and tracking when an object is created or updated, wherein the graphical user interface is configured to report the update to the response associated with the compliance event by causing the backend to set a previous finding property to false, create a new finding with updated edited details, set a property of the new finding to true, and store results in the database.

5. The asset control and management system of claim 3, wherein the graphical user interface is configured to display a determined status of each asset or system connected to the network including one or more of a hostname, an internet protocol ("IP") address, a media access control ("MAC") address, a full computer name, a group designation, an asset type, and a role, and wherein the graphical user interface is configured to search and/or filter based on the hostname, the IP address, the group designation, the asset type, the role, or a security technical implementation guide ("STIG").

6. The asset control and management system of claim 1, wherein the instructions further comprise generating a proposed response including identifying a remedial executable program based on the status of the asset compared to the checklist, wherein generating the proposed response includes creating a script to address the difference to change a configuration setting to match a rule, wherein a graphical user interface is configured to display the proposed response including rule content and fix text including computer code or source code to be implemented or parameters to be input into an executable code or program, and a result of a compliance event associated with the executable program.

7. The asset control and management system of claim 1, wherein the executable program is configured to change a number of protocols or settings associated with the asset connected to the network by grouping one or more assets based on similarities or the status, retrieving selected or grouped asset identification, looping through each of a plurality of selected or grouped asset identifications to create a new finding with the selected or grouped asset identification and updated finding data, and updating a group property of the one or more assets in a database.

8. The asset control and management system of claim 1, wherein the instruction to operate the management program is responsive to an update to the checklist by comparing a previous STIG to a new STIG, differentiating the previous STIG and the new STIG by titles, a date associated with the previous STIG, or a content of the previous STIG, creating findings with a status for each vulnerability in the new STIG of each asset, executing a script to change a configuration setting to match a rule, re-running a STIG analysis tool to ensure the configuration setting is changed and satisfies the rule, and rebooting the asset.

9. A computer-implemented method for asset control and management, the method comprising:

authenticating, by a network server, a user to access a web-application associated with an asset control and management system;

accessing, by the network server, a checklist stored in a network memory;

determining, by the network server, a status of an asset connected to a network, wherein the status includes current protocols, settings, or configurations of the asset;

determining, by the network server, a difference between the status of the asset and the checklist;

receiving, from a network database associated with the network memory, a script that includes command-line executables for configuration changes and a registry update file configured to update a registry of the asset, wherein the registry includes Group Policy updates;

exporting, by the network server, the script to the asset;

executing, by a backend executed by the network through a remote connection with the asset, the script on the asset to adjust a configuration setting associated with the difference; and setting, by the network server, an updated status associated with the asset after the script is executed.

10. The computer-implemented method of claim 9, further comprising generating, by the network server, a proposed response including identifying a remedial executable program based on the status of the asset compared to the checklist.

11. The computer-implemented method of claim 9, further comprising sending data to and receiving the data from a graphical user interface by application programming interface instructions, wherein the graphical user interface displays a result of a compliance event associated with execution of the script.

12. The computer-implemented method of claim 9, further comprising grouping a plurality of assets based on similarities or the status and implementing the script for the plurality of assets.

13. The computer-implemented method of claim 9, further comprising re-running a STIG analysis tool after executing the script to verify that the setting associated with the difference was changed and satisfies a rule of the checklist.

14. The computer-implemented method of claim 9, further comprising displaying, by a graphical user interface, fix text that includes computer code or source code to be implemented or parameters to be input into an executable code or program.

15. A non-transitory computer-readable medium comprising:

a processor of a network server in a network; and instructions executable by the processor to:

authenticate a user to access a web-application;

access a database with one or more checklists;

determine a status of one or more assets, wherein the status includes a host computer protocol, settings, or configurations of the one or more assets;

determine a difference between the status and the one or more checklists;

receive a script that includes command-line executables for configuration changes along with a .reg file to update a registry, wherein the registry includes Group Policy updates;

export the script to an asset comprising a computer connected to the network;

execute the script on the asset by a backend executed by the network through a remote connection with the asset to change a configuration setting associated with the difference, and re-run a STIG analysis tool to ensure the host computer protocol, a configuration setting is changed and satisfies the one or more checklists.

16. The non-transitory computer-readable medium of claim 15, wherein the instructions further comprise retrieving one or more STIGs based on the asset or retrieving a list of assets based on a STIG.

17. The non-transitory computer-readable medium of claim 15, wherein the instructions further comprise creating an asset group object in a database and updating a group property of assets selected to be part of the asset group object.

18. The non-transitory computer-readable medium of claim 17, wherein the instructions further comprise extracting vulnerability and findings data from a raw checklist file and creating new findings based on an extracted status, comments, details, and/or vulnerabilities of the one or more checklists.

19. The non-transitory computer-readable medium of claim 17, wherein the instructions further comprise generating the script that includes the command-line executables for the configuration changes along with the .reg file to update the registry.

20. The non-transitory computer-readable medium of claim 15, wherein the instructions further comprise causing a graphical user interface to display fix text that includes computer code or source code to be implemented or parameters to be input into an executable code or program and a result of a compliance event associated with the script.

* * * * *